(12) United States Patent
Fujimoto et al.

(10) Patent No.: US 7,671,144 B2
(45) Date of Patent: Mar. 2, 2010

(54) PRESSURE SENSITIVE ADHESIVE COMPOSITION

(75) Inventors: Kazuhide Fujimoto, Akashi (JP); Kazuhiko Ueda, Kobe (JP)

(73) Assignee: Kaneka Corporation, Osaka-shi (JP)

( * ) Notice: Subject to any disclaimer, the term of this patent is extended or adjusted under 35 U.S.C. 154(b) by 0 days.

(21) Appl. No.: 10/586,859

(22) PCT Filed: Jan. 26, 2005

(86) PCT No.: PCT/JP2005/001025

§ 371 (c)(1), (2), (4) Date: Jan. 22, 2007

(87) PCT Pub. No.: WO2005/073333

PCT Pub. Date: Aug. 11, 2005

(65) Prior Publication Data

US 2007/0167584 A1    Jul. 19, 2007

(30) Foreign Application Priority Data

Jan. 30, 2004    (JP) ............... 2004-024172

(51) Int. Cl.
*C08L 83/00* (2006.01)
*B32B 7/12* (2006.01)

(52) U.S. Cl. .................. 525/474; 428/355 R

(58) Field of Classification Search ............ 525/403, 525/477, 474; 428/355 R
See application file for complete search history.

(56) References Cited

U.S. PATENT DOCUMENTS

| | | | | |
|---|---|---|---|---|
| 4,444,974 A | * | 4/1984 | Takase et al. | 528/33 |
| 4,463,115 A | | 7/1984 | Hirose et al. | |
| 4,665,127 A | * | 5/1987 | Hirose et al. | 525/100 |
| 4,707,526 A | * | 11/1987 | Sasaki et al. | 525/404 |
| 4,735,829 A | * | 4/1988 | Hirose et al. | 427/387 |
| 4,910,255 A | * | 3/1990 | Wakabayashi et al. | 525/100 |
| 4,963,626 A | * | 10/1990 | Hirose et al. | 525/403 |
| 5,063,270 A | * | 11/1991 | Yukimoto et al. | 524/306 |
| 5,109,064 A | * | 4/1992 | Wakabayashi et al. | 525/100 |
| 5,286,780 A | * | 2/1994 | Iwakiri et al. | 524/500 |
| 5,342,914 A | * | 8/1994 | Iwakiri et al. | 528/32 |
| 5,541,266 A | * | 7/1996 | Hasegawa et al. | 525/403 |
| 5,684,094 A | * | 11/1997 | Suzuki et al. | 525/403 |
| 5,976,669 A | * | 11/1999 | Fleming | 428/143 |
| 6,207,766 B1 | * | 3/2001 | Doi et al. | 525/403 |
| 6,369,187 B1 | * | 4/2002 | Fujita et al. | 528/29 |
| 6,437,071 B1 | * | 8/2002 | Odaka et al. | 528/15 |
| 6,642,309 B2 | * | 11/2003 | Komitsu et al. | 525/100 |
| 7,144,953 B2 | * | 12/2006 | Ueda et al. | 525/100 |
| 2002/0137841 A1 | * | 9/2002 | Nakagawa et al. | 525/100 |
| 2005/0131168 A1 | * | 6/2005 | Fujita et al. | 525/539 |

FOREIGN PATENT DOCUMENTS

| | | |
|---|---|---|
| EP | 0 336 431 | 10/1989 |
| JP | 59-71377 A | 4/1984 |
| JP | SHO-59-71377 | 4/1984 |
| JP | 60-35069 A | 2/1985 |
| JP | SHO-60-35069 | 2/1985 |
| JP | 61-116327 A | 6/1986 |
| JP | SHO-61-116327 | 6/1986 |
| JP | 2-132174 A | 5/1990 |
| JP | HEI-2-132174 | 5/1990 |
| JP | 2003-105303 | 4/2003 |
| JP | 2003-105303 A | 4/2003 |
| JP | 2004-115780 | 4/2004 |
| JP | 2004-115780 A | 4/2004 |
| WO | WO03/35755 * | 4/2004 |

* cited by examiner

*Primary Examiner*—Randy Galakowski
*Assistant Examiner*—Robert Loewe
(74) *Attorney, Agent, or Firm*—Sughrue Mion, PLLC

(57) ABSTRACT

The present invention has its object to provide a pressure sensitive adhesive composition which can be applied using no organic solvent or using almost no organic solvent and which manifests excellent pressure sensitive adhesion characteristics. This object can be achieved by a pressure sensitive adhesive composition which comprises, as essential constituents, the following: (A) an oxyalkylene polymer containing 0.3 to 0.7 equivalent of a hydrolyzable silyl group in each molecule and having a number average molecular weight of 15,000 to 100,000 (hydrolyzable silyl group-containing polymer); (B) a tackifier resin; (C) a curing catalyst.

4 Claims, No Drawings

PRESSURE SENSITIVE ADHESIVE COMPOSITION

TECHNICAL FIELD

The present invention relates to a pressure sensitive adhesive composition. More particularly, it relates to a pressure sensitive adhesive composition which comprises, as essential constituents, an oxyalkylene polymer (A) containing 0.3 to 0.7 equivalent of a hydrolyzable silyl group in each molecule and having a number average molecular weight of 15,000 to 100,000 (hereinafter, "hydrolysable silyl group-containing polymer"), a tackifier resin (B) and a curing catalyst (C).

BACKGROUND ART

Pressure sensitive adhesive compositions comprising a curable polymer combined with a tackifier resin are well known in the art.

Pressure sensitive adhesive compositions comprising a hydrolyzable silyl group-containing oxyalkylene polymer among such curable polymers and a tackifier resin can be applied for coating using no organic solvent or using almost no organic solvent and therefore have been proposed as pressure sensitive adhesive compositions exerting no adverse influences on the environment (cf. e.g. Japanese Kokai Publication Sho59-71377). When a hydrolyzable silyl group-containing oxyalkylene polymer is used, such characteristics as affinity for various adherends, hydrophilicity and chemical stability owing to the chemical structure of this polymer, in particular, can be manifested and therefore investigations have been made to extend the range of application of such polymer to various fields, including repeeling, among others. However, the pressure sensitive adhesive compositions mentioned above are unsatisfactory in characteristics required of pressure sensitive adhesives, for example in adhesive strength and holding ability upon sticking to curved surfaces. Further, when a tackifier resin is used in large amounts to increase the adhesive strength, such good characteristics of the oxyalkylene polymers as affinity for various adherends, hydrophilicity and chemical stability, are sacrificed.

SUMMARY OF THE INVENTION

It is an object of the present invention to provide a pressure sensitive adhesive composition which can be applied using no organic solvent or using almost no organic solvent without impairing the good affinity for various adherends, hydrophilicity, chemical stability and other characteristics intrinsic in oxyalkylene polymers, and which manifests excellent pressure sensitive adhesion characteristics.

The present inventors made various investigations and, as a result, found that a pressure sensitive adhesive composition which comprises the components (A), (B) and (C) defined below can be applied using no organic solvent or using almost no organic solvent and can manifest good adhesive strength after curing, and have now completed the present invention:

(A) An oxyalkylene polymer containing 0.3 to 0.7 equivalent of a hydrolyzable silyl group in each molecule and having a number average molecular weight of 15,000 to 100,000 (hereinafter, "hydrolyzable silyl group-containing polymer");

(B) A tackifier resin;
(C) A curing catalyst.

EFFECT OF THE INVENTION

The pressure sensitive adhesive composition of the invention can be applied using no organic solvent or using almost no organic solvent and still manifests good pressure sensitive adhesion characteristics.

DETAILED DESCRIPTION OF THE INVENTION

As the main chain skeleton of the oxyalkylene polymer containing 0.3 to 0.7 equivalent of a hydrolyzable silyl group in each molecule and having a number average molecular weight of 15,000 to 100,000, there may be mentioned those comprising a repeating unit or units represented by the general formula (1):

$$—R^1—O— \quad\quad\quad (1)$$

(wherein $R^1$ is a divalent alkylene group.)

In the general formula (1), $R^1$ is preferably a straight or branched alkylene group containing 1 to 14 carbon atoms, more preferably 2 to 4 carbon atoms. As specific examples of the repeating unit represented by the general formula (1), there may be mentioned $—CH_2O—$, $—CH_2CH_2O—$, $—CH_2CH(CH_3)O—$, $—CH_2CH(C_2H_5)O—$, $—CH_2C(CH_3)_2O—$, $—CH_2CH_2CH_2CH_2O—$ and the like. The main chain skeleton of the oxyalkylene polymer may comprise only one repeating unit species or two or more repeating unit species. In particular, polymers comprising $—CH_2CH(CH_3)O—$ as the main repeating unit are preferred from the raw material availability and workability viewpoint. The polymer main chain may contain another repeating unit species other than the oxyalkylene group species. In this case, the total sum of oxyalkylene units in the polymer is preferably not less than 80% by weight, more preferably not less than 90% by weight.

The (A) component polymer may be a straight chain polymer or a branched chain polymer, or a mixture of them. For attaining good peeling properties, the proportion of a straight chain polymer in the (A) component polymer is preferably not lower than 50% by weight.

As for the molecular weight, the (A) component polymer preferably has a number average molecular weight of 15,000 to 100,000, more preferably 20,000 to 50,000. When the number average molecular weight is lower than 15,000, the pressure sensitive adhesive composition obtained will be excessively high in viscosity and no good pressure sensitive adhesion characteristics will be obtained. Conversely, when the number average molecular weight is above 100,000, the viscosity will become excessively high and the workability will unfavorably decline markedly. The number average molecular weight can be determined by various methods. Generally, the conversion calculation based on the result of terminal group analysis of the oxyalkylene polymer or the determination by gel permeation chromatography (GPC) is a common method. The term "molecular weight" as used herein denotes the molecular weight determined by gel permeation chromatography (GPC).

The molecular weight distribution (Mw/Mn) of the (A) component polymer is preferably not wider than 1.6, more preferably not wider than 1.4, so that the viscosity of the polymer may be retained at a low level.

The hydrolyzable silyl group-containing organic polymer to be used in the practice of the invention can be obtained by introducing a hydrolyzable silyl group into an oxyalkylene polymer known as hydroxyl-terminated polyether polyol by an appropriate method.

Methods of producing such polymers have been proposed, for example, in Japanese Kokai Publication Hei03-72527, Japanese Kokai Publication Hei03-47825 and Japanese Kokai Publication Hei03-79627.

The oxyalkylene polymer to be used in the practice of the invention can be produced by reacting a monoepoxide such as an alkylene oxide with such an initiator as a hydroxyl compound having at least one hydroxyl group in the presence of a metal porphyrin catalyst, compound metal cyanide complex catalyst, phosphazene catalyst or like catalyst. Production methods particularly preferred among these are the production methods using a compound metal cyanide complex catalyst or phosphazene catalyst. This is because the oxyalkylene polymers obtained by these particularly preferred methods are narrow in molecular weight distribution and therefore low in viscosity and produces no color hue problem.

The hydroxyl compound to be used as the initiator preferably has two or more functional groups and includes, among others, propylene glycol, glycerol, pentaerythritol and, further, PPG, PPT (polyoxypropylenetriol) and so on.

As the polyether to be used as the initiator, there may specifically be mentioned polyoxyethylene, polyoxypropylene, polyoxybutylene, polyoxyhexylene, polyoxytetramethylene, and copolymers of these.

Particularly preferred polyethers are polyoxypropylene diol and polyoxypropylene triol, allyl-terminated polyoxypropylene and methallyl-terminated polyoxypropylene, among others.

The hydrolyzable silyl group so referred to herein is a silicon-containing functional group capable of being crosslinked under siloxane bond formation.

For example, silyl groups represented by the following general formula (I) are typical hydrolyzable silyl groups. However, the hydrolyzable silyl group so referred to herein is not limited thereto.

$$—SiX_aR^2{}_{3-a} \qquad (I).$$

In the above formula, $R^2$ is a substituted or unsubstituted monovalent organic group containing 1 to 20 carbon atoms, preferably an alkyl group containing not more than 8 carbon atoms or a phenyl or fluoroalkyl group, particularly preferably methyl, ethyl, propyl, butyl, hexyl, cyclohexyl, phenyl or the like.

X is a hydrolyzable group, for example a halogen atom or an alkoxy, alkenyloxy, acyloxy, amido, amino, aminoxy, ketoximate, acid amide, or halide group.

Among them, the carbon-containing hydrolyzable group preferably contains not more than 6 carbon atoms, particularly preferably not more than 4 carbon atoms. As preferred hydrolyzable groups, there may be mentioned lower alkoxy groups containing not more than 4 carbon atoms, in particular methoxy, ethoxy, propoxy, propenyloxy and the like. The symbol a represents 1, 2 or 3 and particularly preferably it is 2 or 3.

The method of introducing a silyl group represented by the general formula (I) into the oxyalkylene polymer is not particularly restricted but the silyl group introduction can be realized, for example, by the following methods.

(α) The method comprising introducing an olefinic group into a hydroxyl or like functional group-containing oxyalkylene polymer, followed by reacting with a hydrosilyl compound represented by the general formula (2):

$$HSiX_aR^2{}_{3-a} \qquad (2)$$

(wherein $R^2$, X and a are as defined above.)

Here, as the olefinic group introduction method, there may be mentioned, among others, the method comprising reacting a compound having both an unsaturated group and a functional group capable of reacting with a hydroxyl group with the hydroxyl group of the oxyalkylene polymer under formation of such a bond as an ether, ester, urethane or carbonate bond, and the olefinic group introduction method comprising adding an olefinic group-containing epoxy compound such as allyl glycidyl ether for copolymerization on the occasion of alkylene oxide polymerization.

(β) The method comprising reacting a compound represented by the general formula (3) given below with an oxyalkylene polymer containing a functional group capable of reacting with the isocyanate compound.

$$(R^2—)_{3-a}SiX_aR^3—NCO \qquad (3)$$

(wherein, $R^2$, X and a are as defined above, and $R^3$ is a divalent hydrocarbon group containing 1 to 17 carbon atoms.)

(γ) The method comprising reacting a polyisocyanate compound such as tolylene diisocyanate with an oxyalkylene polymer containing a functional group capable of reacting with the isocyanate compound for isocyanate group introduction, followed by reacting the W group of a silicon compound represented by the general formula (4):

$$(R^2—)_{3-a}SiX_a—R^3W \qquad (4)$$

(wherein $R^2$, $R^3$, X and a are as defined above, and W is an active-hydrogen-containing group selected from among hydroxyl, carboxyl, mercapto and (primary or secondary) amino groups.)

(δ) The method comprising introducing an olefinic group into an oxyalkylene polymer containing a functional group allowing introduction of the olefinic group thereinto and then reacting the olefinic group with a silicon compound represented by the general formula (4) in which W is a mercapto group.

The hydrolyzable silyl group-containing polymer, which is the (A) component to be used according to the invention, preferably contains 0.3 to 0.7 equivalent of a hydrolyzable silyl group in each molecule. When the hydrolyzable silyl group content in each molecule of the (A) component is lower than 0.3 equivalent, no satisfactory pressure sensitive adhesive composition can be obtained. Conversely, when it is above 0.7 equivalent, the flexibility of the cured pressure sensitive adhesive is sacrificed and no good pressure sensitive adhesive properties can be obtained.

The unit "equivalent" as used hereinabove is defined as follows.

Thus, it is the amount of any of the hydrolyzable silyl groups given by way of example under (α) to (δ) as introduced into and occurring in the oxyalkylene polymer relative to the total amount of a functional group allowing introduction of the hydrolyzable silyl group thereinto.

As examples of the (B) component tackifier resin to be used in accordance with the invention, there may be mentioned terpene resins, terpene-phenol resins, petroleum resins and rosin ester resins, among others. These may be used singly or two or more of them may be used in admixture according to need.

As for the compounding ratio in the practice of the invention, the (B) component is preferably used in an amount of 5 to 150 parts by weight, more preferably 10 to 120 parts by weight, per 100 parts by weight the (A) component. The most preferred range is 20 to 100 parts by weight. At levels lower than 5 parts by weight, the resulting composition may possibly become poor in pressure sensitive adhesive properties and, at levels exceeding 150 parts by weight, the characteristics of the polymer (A), namely good affinity for various adherends, hydrophilicity and chemical stability, among others, may possibly be sacrificed.

As for the curing catalyst, which is the (C) component in the practice of the invention, those known in the art as silanol condensation catalysts can be widely used. As specific examples thereof, silanol condensation catalysts including titanium compounds such as titanium tetrabutoxide, tetrapropyl titanate, tetraacetylacetonate titanium, acetoacetate titanium, etc.; tetravalent tin compounds such as dibutyltin dilaurate, dibutyltin maleate, dibutyltin phthalate, dibutyltin dioctanoate, dibutyltin di(ethyl hexanoate), dibutyltin di(methyl maleate), dibutyltin di(ethyl maleate), dibutyltin di(butyl maleate), dibutyltin di(octyl maleate), dibutyltin di(tridecyl maleate), dibutyltin di(benzyl maleate), dibutyltin diacetate, dioctyltin di(ethyl maleate), dioctyltin di(octyl maleate), dibutyltin dimethoxide, dibutyltin di(nonyl phenoxide), dibutenyltin oxide, dibutyltin di(acetyl acetonate), dibutyltin di(ethyl acetoacetate), reaction products of dibutyltin oxide with phthalic esters, etc.; divalent tin compounds such as stannous octanoate, tin naphthenate, stannous stearate, stannous versatate, etc.; organoaluminum compounds such as aluminum tris(acetylacetonate), aluminum tris(ethyl acetoacetate), diisopropoxyaluminum-ethyl acetoacetate, etc.; zirconium compounds such as zirconium tetraacetylacetonate etc.; lead octanoate; amine compounds such as butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole, 1,8-diazabicyclo(5.4.0)undecene-7 (DBU), etc. or salts of these amine compounds with carboxylic acids etc.; low molecular weight polyamide resins obtainable from an excess of a polyamine with polybasic acids; reaction products of an excess of a polyamine with epoxy compounds; silane coupling agents having an amino group such as γ-aminopropyltrimethoxysilane, N-(β-aminoethyl)aminopropylmethyldimethoxysilane, etc.; other known silanol condensation catalysts such as other acid catalysts and basic catalysts, among others, can be mentioned. These catalysts may be used each independently or in a combination of two or more species.

The amount of use of such a curing catalyst is preferably about 0.1 to 20 parts by weight relative to a combined total of 100 parts by weight of the organic polymer (A) and tackifier resin (B) (when the tackifier resin (B) species is a particular one, for example when the tackifier resin (B) does not involve with the silanol condensation reaction at all, the above-mentioned amount is the one relative to 100 parts by weight of the organic polymer (A)). Too low amount of use of the curing catalyst is not preferable, because the curing speed is decreased and the curing reaction does not proceed sufficiently. On the other hand, too high amount of use of the curing catalyst is not preferable, because local exothermic reaction and foaming take place in curing and a good cured product cannot be easily obtained.

The method of preparing the pressure sensitive adhesive composition of the invention is not particularly restricted but use can be made of any of the ordinary methods comprising, for example, compounding the above-mentioned components together and kneading the mixture at ordinary temperature or under heating using a mixer, roll, kneader or the like, or dissolving each component in a small amount of an appropriate solvent, followed by mixing together.

The pressure sensitive adhesive composition of the invention can further contain one or more of various fillers and additives known in the art.

For the purpose of enhancing the activity of the condensation catalyst, the curable composition of the invention may be supplemented with a silicon compound which may be represented by the general formula: $R^2_{4-a}Si(OR^2)_a$ (wherein the $R^2$ groups and a represent the same as the above). This silicon compound is not restricted but the compounds of the above general formula wherein at least one of R diretly bonded to Si atom is an aryl group of 6 to 20 carbon atoms, such as phenyltrimethoxysilane, phenylmethyldimethoxysilane, phenyldimethylmethoxysilane, diphenyldimethoxysilane, diphenyldiethoxysilane, and triphenylmethoxysilane, are preferred because these are especially effective in accelerating the curing reaction of the composition. In consideration of cost and availability, diphenyldimethoxysilane and diphenyldiethoxysilane are particularly preferred.

When this silicon compound is used, the formulating amount thereof is preferably about 0.01 to 20 parts by weight, more preferably 0.1 to 10 parts by weight, relative to a combined total of 100 parts by weight of the polymer (A) and tackifier resin (B) (when the tackifier resin (B) species is a particular one, for example when the tackifier resin (B) does not involve with the silanol condensation reaction at all, the above-mentioned amount is the one relative to 100 parts by weight of the organic polymer (A)). If the formulating amount of the silicon compound is below the above range, the accelerating effect on the curing reaction tends to be insufficient. On the other hand, if the formulating amount of the silicon compound exceeds the above range, the hardness and tensile strength of the cured product tend to be decreased.

The composition of the invention may be supplemented with a silane coupling agent, a reaction product of a silane coupling agent, or a compound other than a silane coupling agent as an adhesion-imparting agent. Specifically, the silane coupling agent includes isocyanato group-containing silanes such as γ-isocyanatopropyltrimethoxysilane, γ-isocyanatopropyltriethoxysilane, γ-isocyanatopropylmethyldiethoxysilane, γ-isocyanatopropylmethyldimethoxysilane, etc.; amino group-containing silanes such as γ-aminopropyltrimethoxysilane, γ-aminopropyltriethoxysilane, γ-aminopropylmethyldimethoxysilane, γ-aminopropylmethyldiethoxysilane, γ-(2-aminoethyl) aminopropyltrimethoxysilane, γ-(2-aminoethyl) aminopropylmethyldimethoxysilane, γ-(2-aminoethyl) aminopropyltriethoxysilane, γ-(2-aminoethyl) aminopropylmethyldiethoxysilane, γ-ureidopropyltrimethoxysilane, N-phenyl-γ-aminopropyltrimethoxysilane, N-benzyl-γ-aminopropyltrimethoxysilane, N-vinylbenzyl-γ-aminopropyltriethoxysilane, etc.; mercapto group-containing silanes such as γ-mercaptopropyltrimethoxysilane, γ-mercaptopropyltriethoxysilane, γ-mercaptopropylmethyldimethoxysilane, γ-mercaptopropylmethyldiethoxysilane, etc.; epoxy group-containing silanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane, β-(3,4-epoxycyclohexyl)ethyltriethoxysilane, etc.; carboxysilanes such as β-carboxyethyltriethoxysilane, β-carboxyethylphenylbis(2-methoxyethoxy)silane, N-β-(carboxymethyl)aminoethyl-γ-aminopropyltrimethoxysilane, etc.; vinyl type unsaturated group-containing silanes such as vinyltrimethoxysilane, vinyltriethoxysilane, γ-methacryloyloxypropylmethyldimethoxysilane, γ-acryloyloxypropylmethyltriethoxysilane, etc.; halogen-containing silanes such as γ-chloropropyltrimethoxysilane etc.; and isocyanurate silanes such as tris(trimethoxysilyl) isocyanurate and so forth. Furthermore, the modification derivatives of these silanes, such as amino-modified silyl polymers, silylated amino group-containing polymers, unsaturated aminosilane complexes, phenylamino(long-chain)alkylsilanes, aminosilylated silicones, silylated polyesters, etc. may also be used likewise as silane coupling agents. In the present invention, the silane coupling agent is used generally within the range of 0.1 to 20 parts by weight, particularly preferably 0.5 to 10 parts by weight, relative to a combined total of 100 parts by weight of the polymer (A) and tackifier resin (B) (when the tackifier resin (B) species is a particular one, the above-mentioned amount is the one relative to 100 parts by weight of the organic polymer (A)).

Now, the method of producing pressure sensitive adhesive products using the pressure sensitive adhesive composition of the invention is explained by describing an exemplary production process. However, the fundamental production method comprises applying the pressure sensitive adhesive composition to a support, followed by thermal curing, and the following example has no restrictive meaning.

The pressure sensitive adhesive composition of the invention is applied to a support using a coater and thermally cured to give a pressure sensitive adhesive product. Usable as the support are synthetic resin or modified natural films, paper, all kinds of cloth, metal foils and so forth. Specific examples of the support material include, but are not limited to, polyethylene, polypropylene, polyimides, polycarbonates, polyvinyl chloride, polyesters, polyurethanes, cellophane, impregnated paper, coated paper, woodfree paper, kraft paper, cloths, acetate cloths, nonwoven fabrics, glass cloths and metal foils. These may be used singly or at least two species may be used in the form of laminates.

The application can be carried out in the manner of either direct application to the support or application to a release liner, followed by transfer to the support after curing.

For securing the applicability to the support or release liner or the like, it is effective to incorporate such an additive as a cissing inhibitor or release promoter in the composition. Silicone type, acrylic or fluorine-containing cissing inhibitor or release promoter, for instance, can be used.

Usable as the release liner for use in the process comprising application thereto, curing and transfer to the support are those coated with a silicone, olefin-derived or fluorine-containing release agent and, from the cost and secured peelability viewpoint, the use of olefin-derived or solventless silicone release agents are particularly preferred.

The method of thermal curing is not particularly restricted. The curing temperature may vary according to the polymer species used and the compound(s) added. Generally, however, it is preferably within the range of 50° C. to 180° C. The curing time may vary depending on the polymer species used, the compound(s) added and the reaction temperature, among others, but it is generally within the range of 0.1 minute to 24 hours, preferably 1 minute to 10 hours, more preferably 1 minute to 1 hour.

The pressure sensitive adhesive composition of the invention can be used in various pressure sensitive adhesive products intended for use in or for office works in general, paper diapers, PP film adhesion, repeelable products, general packaging, electric appliances and fixation. The pressure sensitive adhesive products produced by using the pressure sensitive adhesive composition of the invention can be used in the form of pressure sensitive adhesive tapes for packaging, pressure sensitive adhesive tapes for office use, masking tapes in painting, pressure sensitive adhesive tapes for electrical insulation, pressure sensitive adhesive tapes for bundling, pressure sensitive adhesive tapes for protective use, pressure sensitive adhesive tapes and sheets for discrimination or decoration, sports tapes, double-sided pressure sensitive adhesive tapes, films and tapes for coping with electromagnetic disturbances, repeelable films and tapes, decorative laminate films, tapes for transporting semiconductor chips, marking films, protective films in deep drawing, films for preventing glass pieces from scattering, pressure sensitive foaming adhesive tapes, waterproofing/water shut off tapes, pressure sensitive adhesive tapes for corrosion prevention, pressure sensitive adhesive tapes for surface protection, pressure sensitive adhesive tapes for dicing, pressure sensitive adhesive tapes for back grinding, pressure sensitive adhesive sheets for printing, pressure sensitive adhesive labels and so on.

In producing the pressure sensitive adhesive products mentioned above, one or more of chemicals, electromagnetic wave absorbers, light absorbers, foaming ingredients and so forth may be added according to the intended use of the products.

BEST MODES FOR CARRYING OUT THE INVENTION

The following examples illustrate the present invention more specifically. These examples are, however, by no means limitative of the scope of the invention.

PRODUCTION EXAMPLE 1

Polyoxypropylene glycol with a number average molecular weight of 31,000 (on the polystyrene equivalent basis) as determined by GPC and a Mw/Mn ratio of 1.2 was prepared by polymerizing propylene oxide using Actcol P-23 (product of MITSUI TAKEDA CHEMICALS, INC., polyoxypropylene glycol) as an initiator, together with zinc hexacyanocobaltate-glyme complex and, then, each terminal hydroxyl group was converted to a metaloxy group, which was reacted with allyl chloride for introducing the unsaturated group into all termini. Thereafter, all the unsaturated groups were reacted with 0.6 equivalent of methyldimethoxysilane to give a methyldimethoxysilyl group-terminated polymer (A-1). The polymer (A-1) had a viscosity (23° C.; type B viscometer) of 46.8 Pa·s.

PRODUCTION EXAMPLE 2

Polyoxypropylene glycol with a number average molecular weight of 31,000 (on the polystyrene equivalent basis) as determined by GPC and a Mw/Mn ratio of 1.2 was prepared by polymerizing propylene oxide using Actcol P-23 (product of MITSUI TAKEDA CHEMICALS, INC., polyoxypropylene glycol) as an initiator, together with zinc hexacyanocobaltate-glyme complex and, then, each terminal hydroxyl group was converted to a metaloxy group, which was reacted with allyl chloride for introducing the unsaturated group into all termini. Thereafter, the unsaturated groups were reacted with 0.4 equivalent of methyldimethoxysilane to give a methyldimethoxysilyl group-terminated polymer (A-2). The polymer (A-2) had a viscosity (23° C.; type B viscometer) of 45.2 Pa·s.

PRODUCTION EXAMPLE 3

Polyoxypropylene glycol with a number average molecular weight of 26,000 (on the polystyrene equivalent basis) as determined by GPC and a Mw/Mn ratio of 1.4 was prepared by polymerizing propylene oxide using Actcol P-23 (product of MITSUI TAKEDA CHEMICALS, INC., polyoxypropylene glycol) as an initiator, together with zinc hexacyanocobaltate-glyme complex and, then, all the terminal hydroxyl groups were reacted with 0.65 equivalent of γ-isocianatopropyltrimethoxysilane (Y-5187, product of Nippon Unicar Company Limited) to give a trimethoxysilyl group-terminated polymer (A-3). The polymer (A-3) had a viscosity (23° C.; type B viscometer) of 48.5 Pa·s.

PRODUCTION EXAMPLE 4

Polyoxypropylene glycol with a number average molecular weight of 10,800 (on the polystyrene equivalent basis) as determined by GPC and a Mw/Mn ratio of 1.2 was prepared by polymerizing propylene oxide using Actcol P-23 as an initiator, together with zinc hexacyanocobaltate-glyme complex and, then, each terminal hydroxyl group was converted to a metaloxy group, which was reacted with allyl chloride for introducing the unsaturated group into all termini. Thereafter, the unsaturated groups were reacted with 0.75 equivalent of methyldimethoxysilane to give a methyldimethoxysilyl group-terminated polymer (A-4). The polymer (A-4) had a viscosity (23° C.; type B viscometer) of 5.9 Pa·s.

PRODUCTION EXAMPLE 5

Polyoxypropylene glycol with a number average molecular weight of 31,000 (on the polystyrene equivalent basis) as determined by GPC and a Mw/Mn ratio of 1.2 was prepared by polymerizing propylene oxide using Actcol P-23 (product of MITSUI TAKEDA CHEMICALS, INC., polyoxypropylene glycol) as an initiator, together with zinc hexacyanocobaltate-glyme complex and, then, each terminal hydroxyl group was converted to a metaloxy group, which was reacted with allyl chloride for introducing the unsaturated group into all termini. Thereafter, the unsaturated groups were reacted with 0.8 equivalent of methyldimethoxysilane to give a methyldimethoxysilyl group-terminated polymer (A-5). The polymer (A-5) had a viscosity (23° C.; type B viscometer) of 47.2 Pa·s.

EXAMPLES 1 TO 3 AND COMPARATIVE EXAMPLES 1 AND 2

Each of the polymers obtained in Production Examples 1 to 5 were compounded with other ingredients according to the corresponding formulation shown in Table 1 to give mixtures.

TABLE 1

|  | Example 1 | Example 2 | Example 3 | Comparative Example 1 | Comparative Example 2 |
|---|---|---|---|---|---|
| A-1 | 100 |  |  |  |  |
| A-2 |  | 100 |  |  |  |
| A-3 |  |  | 100 |  |  |
| A-4 |  |  |  | 100 |  |
| A-5 |  |  |  |  | 100 |
| Tackifier resin*[1] | 80 | 50 | 70 | 80 | 80 |
| Toluene | 40 | 0 | 40 | 0 | 40 |

Unit: parts by weight
*[1]YS Polyster S-145 (product of YASUHARA CHEMICAL CO., LTD., terpene-phenol resin)

Each mixture was supplemented with Orgatix TC-100 (product of MATSUMOTO TRADING CO., LTD., titanium acetylacetonate) in an amount of 4 parts by weight per 100 parts of the polymer and the resulting mixture was thoroughly stirred to give a pressure sensitive adhesive composition.

This pressure sensitive adhesive composition was applied onto a 38-μm-thick polyester film to a size of 8 cm in width and 100 μm in thickness and heated at 130° C. for 3 minutes to give a pressure sensitive adhesive film. The pressure sensitive adhesive film obtained was cut to give 25-mm-wide rectangular strips. Each strip was applied to a 25-mm-wide SUS 304 stainless steel adherend with the surface polished beforehand with a #280 sand paper and, after 60 minutes of standing, the force required for peeling was measured. On that occasion, the peeling temperature and rate were 23° C. and 300 mm/min, respectively, and the peel angle was 180 degrees. The results thus obtained are shown in Table 2.

TABLE 2

|  | Example 1 | Example 2 | Example 3 | Comparative Example 1 | Comparative Example 2 |
|---|---|---|---|---|---|
| Adhesive strength (N/25 mm) | 55.2 | 36.0 | 42.0 | 9.2 | 29.8 |

Each of the pressure sensitive adhesive compositions obtained in Example 1 and Comparative Examples 1 and 2 was applied onto a 2-mm-thick aluminum sheet to a pressure sensitive adhesive layer thickness of 100 μm and cured by heating at 130° C. for 3 minutes. The pressure sensitive adhesive-carrying aluminum sheet obtained was wound around a stainless steel cylinder with a diameter of 5.5 cm and, after 20 seconds of finger pressure application, was allowed to stand, and the adhesion retention after application to the curved surface was checked. The results thus obtained are shown in Table 3.

TABLE 3

|  | Example 1 | Comparative Example 1 | Comparative Example 2 |
|---|---|---|---|
| Retention | Adhesion retained for at least 24 hours. | Immediate peeling off. | Adhesion retained for 10 minutes. |

As is evident from the results shown in Table 2 and Table 3, the pressure sensitive adhesive composition of the invention is excellent in adhesive strength.

The invention claimed is:

1. A pressure sensitive adhesive composition which comprises the following components (A), (B) and (C):
    (A) an oxyalkylene polymer containing 0.3 to 0.7 equivalent of a hydrolyzable silyl group in each molecule and having a number average molecular weight of 20,000 to 50,000 (hereinafter, "hydrolyzable silyl group-containing polymer");
    (B) a tackifier resin;
    (C) a curing catalyst;
    wherein the compounding ratio of the tackifier resin (B) is 5 to 80 parts by weight per 100 parts by weight of the polymer (A).

2. The pressure sensitive adhesive composition according to claim 1
    wherein the Mw/Mn (molecular weight distribution) of the hydrolyzable silyl group-containing polymer (A) is not wider than 1.6.

3. The pressure sensitive adhesive composition according to claim 2 wherein the hydrolyzable silyl group in the hydrolyzable silyl group-containing polymer (A) is represented by the following general formula (I);

$$—SiX_aR^2{}_{3-a} \quad (I)$$

wherein, $R^2$ represents a substituted or unsubstituted monovalent organic group containing 1 to 20 carbon atoms, X represents a hydrolyzable group, and a represents 1, 2 or 3.

4. The pressure sensitive adhesive composition according to claim 1 wherein the hydrolyzable silyl group in the hydrolyzable silyl group-containing polymer (A) is represented by the following general formula (I);

$$—SiX_aR^2{}_{3-a} \quad (I)$$

wherein, $R^2$ represents a substituted or unsubstituted monovalent organic group containing 1 to 20 carbon atoms, X represents a hydrolyzable group, and a represents 1, 2 or 3.

* * * * *